June 14, 1932.  F. H. DELLAREE  1,862,845
SPINDLE FOR SCREW DRIVING MACHINES
Original Filed Jan. 9, 1926    2 Sheets-Sheet 1
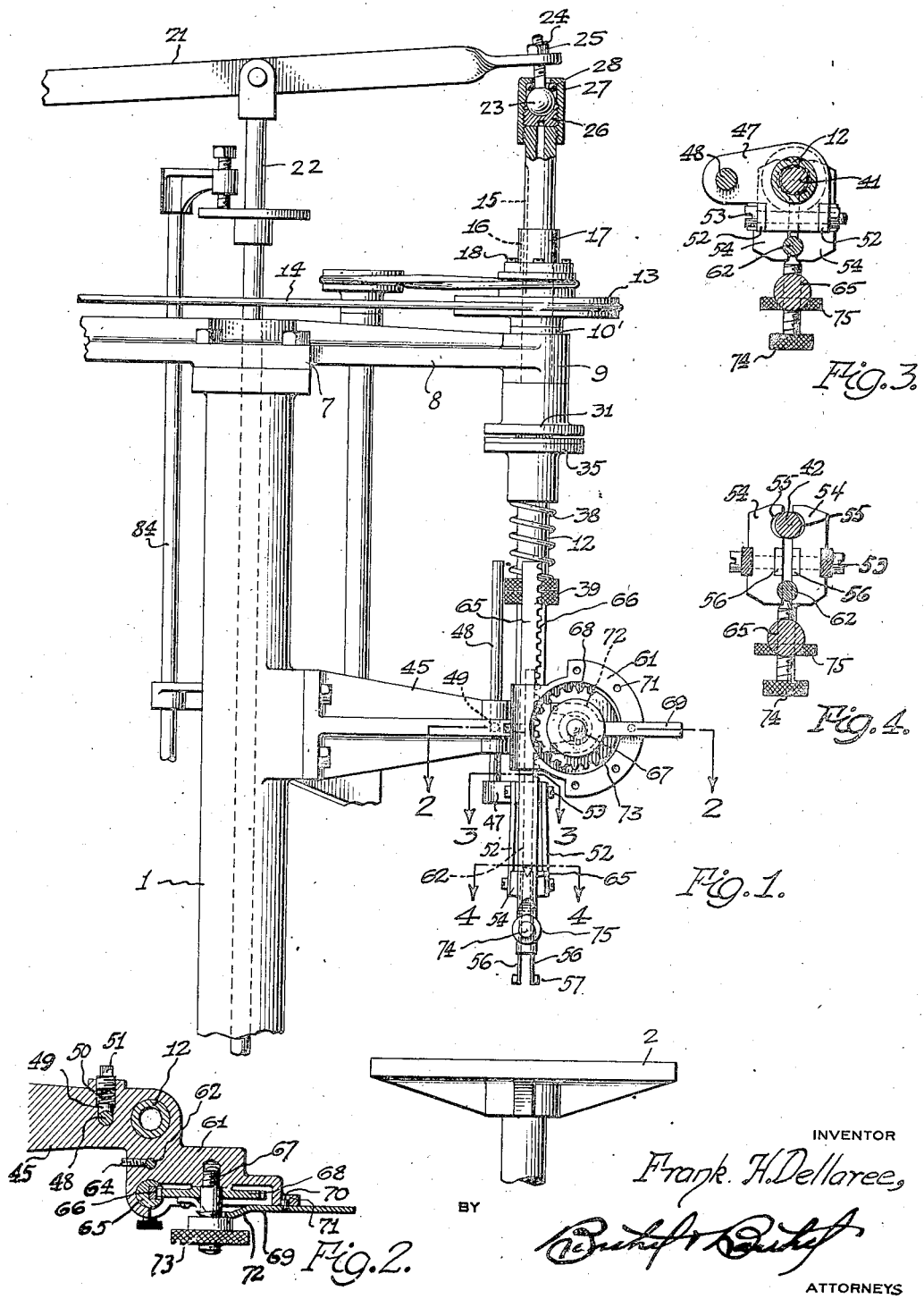
INVENTOR
Frank H. Dellaree,
BY
ATTORNEYS June 14, 1932.　　F. H. DELLAREE　　1,862,845
SPINDLE FOR SCREW DRIVING MACHINES
Original Filed Jan. 9, 1926　　2 Sheets-Sheet 2
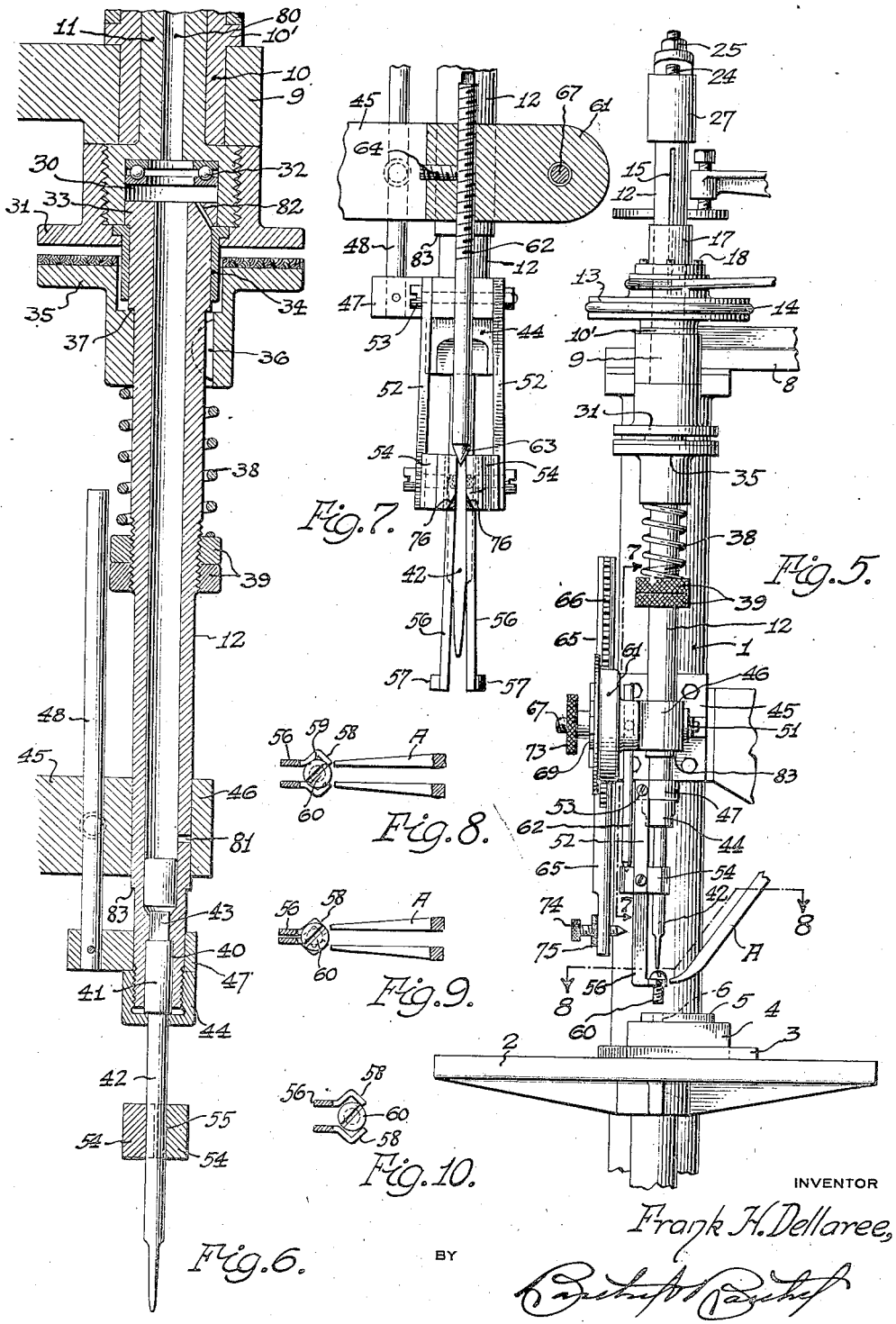

Patented June 14, 1932

1,862,845

UNITED STATES PATENT OFFICE

FRANK H. DELLAREE, OF DETROIT, MICHIGAN

SPINDLE FOR SCREW DRIVING MACHINES

Original application filed January 9, 1926, Serial No. 80,184. Patent No. 1,813,697, dated July 7, 1931. Divided and this application filed January 2, 1931. Serial No. 506,116.

The present invention pertains to a novel spindle assembly for a screw driving machine, although it is equally useful in machines for analogous purposes, wherein a member is to be driven into a piece of work by rotary action or by pressure. This application is a division of my co-pending application Serial No. 80,184, filed January 9, 1926, with slight changes in the construction of the device for supporting the fastener element on its way to the work.

The principal object of the invention is to provide a device of this nature designed particularly for use in rapid or automatic machinery where the operations are to be performed quickly and in rapid succession. In such a machine, the means for supporting the fastener on its way to the work must be entirely released from the element at the proper instant to permit the element to be driven home. Another requirement, particularly in the case of turning a screw, is that the driving tool be relieved of its positive drive when the fastener element reaches home, for otherwise the threads would be stripped. In the accomplishment of the object of this invention, these requirements are met by mechanism which operates automatically at the proper times to perform these functions. At the initial or starting position of the spindle, the device for supporting the fastening element is in position to receive such an element from an adjacent feed chute. As the element approaches the work, it is automatically engaged more firmly by the supporting means, and the driving tool takes up a positive drive through a friction clutch. Prior to the time that the fastening element reaches home, it is automatically released by the supporting means, and when it reaches home, the positive drive on the driving tool is enabled to slip.

The invention is described and claimed with reference to a spindle which moves the fastening element downwardly towards the work, but it is to be understood that the words defining vertical relations in the claims are used in a relative sense, indicating the relative distances of various parts from the work, whether the spindle be vertical or horizontal or inclined.

The invention is fully disclosed by way of example in the following description and in the accompanying drawings, in which—

Figure 1 is a side elevation of a machine embodying the invention;

Figs. 2, 3 and 4 are sections on the lines 2—2, 3—3 and 4—4 respectively of Figure 1;

Fig. 5 is a front elevation of the machine;

Fig. 6 is a longitudinal section of the spindle;

Fig. 7 is a longitudinal section on the line 7—7 of Fig. 5;

Fig. 8 is a section on the line 8—8 of Figure 5, showing the spring fingers in receiving position;

Fig. 9 is a similar section showing the fingers in gripping position; and

Fig. 10 is a similar section showing the fingers in releasing position.

Reference to these views will now be made by use of like characters which are employed to designate corresponding parts throughout.

The numeral 1 designates a column or pedestal embodied in the frame of a machine rigidly supported in any suitable manner. Adjacent the column is a table 2 which likewise is supported in any desired manner, preferably for vertical adjustment, as illustrated in my co-pending application, Serial No. 80,184, filed January 9, 1926. On the table is mounted a jig 3 for properly supporting a piece of work 4 covered by a plate 5 having a tapped hole 6. It may be assumed that the parts 4 and 5 are to be secured together by means of a screw and that this operation is to be performed in rapid succession on a large number of articles.

On the upper arm of the column 1 is secured a spider 7 having an arm 8 formed with a bearing 9. The bearing is lined with a bushing 10 adapted to accommodate a rotatable member 11 which constitutes the upper section of a spindle as will presently appear. A lower spindle section 12 is suspended from the section 11 in a manner which also will be described later.

The bushing 10 has a flange 10' resting upon the bearing 9 and engaged at its upper surface by a sheave 13 driven by a belt 14 connected to any suitable source of power. The member 11 has a keyway 15 for slidably receiving a key 16 extending from a collar 17 which is secured upon the sheave by screws 18. This construction permits vertical movement of the spindle while maintaining a driving relation with the sheave.

For the purpose of sliding the spindle, a lever 21 has one end suitably pivoted to the machine and the other end connected to the upper end of the section 11. From an intermediate point of the lever 21 extends an operating rod 22 which may be brought down by foot pressure on the pedal and returned by a spring in the manner illustrated in the above mentioned application. For the purpose of connecting the free end of the lever to the upper extremity of the spindle, the former has a ball 23 secured therein by a threaded stem 24 and a nut 25. Upon the spindle is mounted a seat 26 shaped to accommodate a portion of the ball 23. A cap 27 is threaded over the upper end of the spindle in such a manner as to retain the seat 26 and overlap the ball, although permitting play of the stem 24 as the angle thereof changes. Ball bearings 28 are preferably inserted between the ball 23 and the overlapping portion of the cap.

The lower end 30 of the upper spindle section 11 is somewhat enlarged and made hollow as shown in Figure 6. A flanged clutch member 31 is threaded around this end for a purpose which will presently appear. A thrust bearing 32 of the ball type is fitted within the upper part of the head. The previously mentioned suspension support of the lower spindle section 12 is provided by forming the upper end of this section with a slightly enlarged head 33 which rests upon a bushing 34 inserted between the members 31 and 12. A cooperating clutch member 35 is slidably keyed as at 36 on the section 12. A shoulder 37 formed on the upper part of the section 12 is adapted to bear downwardly on the clutch member 35. The support for this clutch member consists of a coiled spring 38 beneath this member and bearing on a pair of adjustable lock nuts 39 threaded on the member 12, whereby the tension of the spring may be regulated as desired.

The lower end of the section 12 is formed with a socket 40 receiving the upper end 41 of a driving tool 42. The upper extremity of the tool is formed as a key 43 fitted into the socket so that rotary movement of the section 12 is delivered to the tool. On the lower end of the section 12 is threaded a cap or abutment 44 for a purpose which will presently appear.

From the column 1 extends a bracket 45 having a guide sleeve 46 for the lower spindle section 12. Between the sleeve 46 and the cap 44 is disposed a block 47 for carrying a gripping device for the fastener to be driven into the hole 6. The member 47 is supported by means of a rod 48 extending into the arm 45. The rod 48 is supported within the arm in a frictional and yielding manner by means of a spring pressed clamp member 49 engaging the rod and backed by a spring 50 in turn engaged by an adjustable screw plug 51. The device for supporting the fastener further includes a pair of spring strips 52 secured to opposed parallel faces of the block 47 by means of a stud 53 and carrying blocks 54 at their lower ends. The blocks are adapted to abut one another and are formed with a bore 55 in their abutting faces for accommodating the tool 42. Resilient spring fingers 56 extend downwardly from the inner faces of the blocks and have their lower extremities 57 directed laterally and formed with outward angles 58 to provide a space 59 for receiving a fastening member 60. In the particular example illustrated, the fastening member has a head which rests upon the lateral parts 57 but it will be apparent that the invention is equally useful in connection with an unheaded fastening element, in which case this element has its shank gripped by the parts 57.

The arm 45 has an offset portion 61 through which is passed a threaded member 62 with a pointed lower end 63, as shown in Figure 7. This member is locked in any desired vertical position by a set screw 64. The point 63 is in line with the slit between the blocks 54 and is so positioned as to spread the blocks and hence the ends 57 when the tool is raised, at which time the abutment 44 on the tool lifts the block 47 and the entire spring finger assembly. The pointed member spreads the spring fingers to the extent illustrated in Figure 8 which is sufficient to permit the entry of the shank of a fastening element delivered from a feed chute A at this time communicating with the laterally extending ends 57. The spacing of the angular parts 58 at this time is such, however, as to support the head of the fastening element.

The offset portion 61 of the arm 45 further carries a device for spreading the spring fingers on the downward movement thereof. This device embodies a rod 65 slidably mounted in the portion 61 and having a rack 66 formed therewith or inserted therein. In the portion 61 is threaded a stud 67 on which is loosely mounted a pinion 68 meshing with the rack. A forked lever 69 is secured to the pinion and carries a pin 70 adapted for adjustment in any one of a series of apertures 71 formed in an arcuate series in the part 61. The lever 69 also has a spring portion 72 bearing against a thumb screw 73 on the nut. The vertical adjustment of the member 65 is thus determined by the particular aperture 71 in which the pin 70 is received, and the adjustment is maintained by tightening the nut 73 against the spring portion 72.

The lower end of the rod 65 carries a pointed screw 74 extending horizontally into the path of the blocks 54. This screw is adjustable through the member 65, and the adjustment is maintained by a lock nut 75. Directly above the point of the screw, the blocks are formed with notches 76 at the abutting faces thereof as shown in Figure 7. The blocks are thus spread apart on coming in contact with the point of the screw on their downward movement, and the spreading in this instance is sufficient to permit the head of the fastening element to pass freely between the angular portions 59 as shown in Figure 10, thus releasing the fastening element entirely. The commencement of the spreading action is determinable by the horizontal adjustment of the screw 74 as well as by the vertical adjustment of the rod 65.

The upper spindle section 11 has a longitudinal bore 80 extending from end to end and which may be filled with lubricant for the bearing 32 and the bearing surfaces between the parts 30 and 33. The lower section 12 is also hollow and has a port 81 leading to the bearing in the guide sleeve 46. An angular duct 82 extends from the upper extremity of the section 12 to the upper end of the bushing 34 for a purpose which will presently appear.

In following the operation of the device, let it be assumed that the spindle assembly is in the raised position illustrated in Figures 1 and 6 wherein the lower section 12 hangs from the bushing 34 and is spaced from the bearing 32, the clutch elements 31 and 35 being also spaced apart. In this position, the blocks 54 receive the point 63 of the upper spreading member, so that the spring fingers are in the position shown in Figure 8 where they may receive a fastener element from the chute A, but do not permit the head thereof to drop between the angular portions 58. At this time, the fastening element 60 is spaced from the work, and the driving tool 42 is spaced slightly from the head of the fastening element.

On the initial downward movement of the upper section 11, there is no resistance to a slight downward movement of the tool 42 and lower section 12, and these parts therefore descend with the upper section 11 at least until the tool engages the head of the fastening member 60. During this slight downward movement the positively driven upper section 11 exerts a light driving effect on the lower section 12 at the contacting surfaces of the parts 33 and 34, and in this interval the point of the tool may find its way into the slot in the head of the member 60. Also, during this downward movement of the tool, the supporting abutment 44 is withdrawn from the block 47. It is to be noticed here that the spring finger assembly derives its support only from the spring 50 acting on the rod 48. The spring strips 56 are of such a nature that they cause the blocks 54 to engage the point 63 with a pressure greater than the tension of the spring 50 against the rod 48. Consequently, on withdrawal of the abutment 44 from the block 47, the pressure of the blocks 54 causes the spring finger assembly to slip off the point 63 and hence move downwardly, whereupon the lower extremities of the spring fingers assume the gripping position shown in Figure 9.

On further downward movement of the upper spindle section 11, the clutch member 31 comes into engagement with the complementary member 35 first lightly and then more firmly. The vertical space left by the bearing 32 is greater than the space between the clutch faces, the difference being taken up by compression and tensioning of the spring 38 after the clutch faces contact with each other. The lower spindle section 12 is thus positively driven while being moved downwardly, and during the light engagement with the clutch elements, the point of the tool 42 finds the slot in the screw head if it has not previously done so. As the clutch element 31 approaches the element 35, the bearing 32 comes into engagement with the upper end of the section 12, so that the downward pressure on the section 11 is delivered to the section 12 without undue friction between these parts. It is to be noted that the clutch is of the friction-surface type, so that in the event of any binding in the driving of a screw, the clutch will merely slip rather than break a part of the machine. By continued downward pressure on the upper section 11, the fastener 60 is brought to the hole 6.

Above the block 47, the lower spindle section 12 is formed with a shoulder 83 which comes into engagement with the block 47 and moves the spring finger assembly downward as the element 60 approaches the work, although the spring finger assembly would be moved downward by the tool 42 and the head of the fastener 60 in the absence of the shoulder 83. The spreading screw 74 is so positioned as to be received in the notches 76 of the blocks 54 as the fastener 60 begins to enter the hole 6 and ultimately to spread the fingers to the extent shown in Figure 10 so that the head of the member 60 may pass freely therebetween to be driven home. The position of the shoulder 37 on the section 12 with respect to the lower clutch element 35 is such that it separates this element from the element 31, when the upper spindle suction 11 is in raised position. When the member 60 has been driven home, the clutch element 31 slips over the element 35 and thus avoids stripping of the threads in the hole 6. The proper action in this respect requires adjustment of the spring tension on the element 35, and such adjustment may readily be made by setting the nuts 39.

On the return or upward pull on the member 11, this member first slips away from the upper end of the member 12. As the upper end of the bushing 34 approaches the head 33, the air between these parts is relieved through the duct 82. It is important that the air be relieved instantaneously in view of the fact that the spindle is reciprocated very rapidly. The formation of an air pocket between the head 33 and upper end of bushing 34, although leaking slowly, would maintain the lower section 12 in a higher position than intended at the upper end of its movement, thereby similarly altering the uppermost position of the spring fingers 52, destroying the alinement of the ends 57 with the chute A, and varying the spreading of the fingers by the point 63. Obviously the duct 82 represents any means of communication from the upper end of bushing 34 to the bores of the spindle sections.

On engagement of the parts 34 and 33, the lower spindle 12 with the tool 42 is lifted. The abutment 44 engages the block 47 and lifts the spring finger assembly to its upper position which is similar to the initial position previously described. In this position, the lateral extremities 57 are in line with the chute A, and the fingers are spread by the point 63 to the extent shown in Figure 8 where a fastening element may be received in the angles 59 without dropping between them. It is to be noticed that the spreading member 62 is not displaced on being struck by the blocks 54 inasmuch as it is securely held by the set screw 64. This member may however be adjusted with respect to the diameter of body of the screw, as its vertical position determines the extent of spreading of the spring fingers 56. The rod 65 is adjusted vertically with respect to the length of the screw, its travel and its original spacing from the work. The upward movement of the spindle assembly may be terminated by the engagement of the clutch member 31 with the bearing 9.

Although a specific embodiment of the invention has been illustrated and described, it will be understood that various alterations in the details of construction may be made without departing from the scope of the invention as indicated by the appended claims.

What I claim:—

1. In a fastener driving machine, an upper spindle section, means for rotating the same, a lower spindle section having a rotary and sliding engagement with said upper section and supported thereby in suspension to descend and rotate frictionally therewith, means carried by said upper section for transmitting downward movement from the upper section to the lower section, said means being spaced from the coacting portion of the lower section in raised or non-driving position of the upper section, whereby to permit partial descent of the upper section prior to the operation of said transmitting means, cooperating clutch elements carried respectively by said sections, and means for lowering and raising said upper section and effecting engagement and disengagement of said clutch elements.

2. In a fastener driving machine, an upper spindle section, means for rotating the same, a lower spindle section having a rotary and sliding engagement with said upper section and supported thereby in suspension to descend and rotate frictionally therewith, a thrust bearing carried by the upper section and adapted to engage the lower section to transmit downward movement from the upper section to the lower section, cooperating clutch elements carried respectively by said sections, and means for lowering and raising said upper section and effecting engagement and disengagement of said clutch elements.

3. In a fastener driving machine, an upper spindle section, means for rotating the same, a lower spindle section having a rotary and sliding engagement with said upper section and supported thereby in suspension to descend and rotate frictionally therewith, a thrust bearing carried by the upper section and adapted to engage the lower section to transmit downward movement from the upper section to the lower section, said bearing being spaced from the coacting portion of the lower section in the raised or non-driving position of the upper section, whereby to permit partial descent of the upper section prior to the engagement of said bearing with said lower section, cooperating clutch elements carried respectively by said sections, said elements being spaced apart in the non-driving position of the upper section and positioned to engage each other on engagement of said bearing with said lower section and means for lowering and raising said upper section and effecting engagement and disengagement of said clutch elements and of said bearing with said lower section.

4. In a fastener driving machine, an upper spindle section, means for rotating the same, a lower spindle section having a rotary and sliding engagement with said upper section and supported thereby in suspension to descend and rotate frictionally therewith, means carried by said upper section for transmitting downward movement from the upper section to the lower section, cooperating friction-surface clutch elements carried respectively by said sections, and means for lowering and raising said upper section and effecting engagement and disengagement of said clutch elements, one of said clutch elements having a resilient support on the corresponding spindle section.

5. In a fastener driving machine, an upper spindle section, means for rotating the same, a lower spindle section having a rotary and sliding mounting on said upper section and suspended therefrom to descend therewith, cooperating clutch elements carried respectively by said sections, means for lowering and raising said upper section and effecting engagement and disengagement of said clutch elements, the clutch element on the lower spindle section having a resilient support thereon, and a shoulder on the upper spindle section adapted to limit the upward movement of said lower clutch element against the action of said resilient support.

6. In a fastener driving machine, a frame, a pair of spring fingers slidably supported by said frame and adapted to hold a fastener and move therewith, a driving tool for a fastener slidably supported by said frame to move towards and away from said fingers, means carried with said tool for lifting said fingers on the upward movement of the tool, finger spreading means carried by said frame and engageable by said fingers on the upward movement of the latter to permit insertion of a fastener between said fingers.

7. In a fastener driving machine, a frame, a pair of spring fingers slidably supported by said frame and adapted to hold a fastener and move therewith, a driving tool for a fastener slidably supported by said frame to move towards and away from said fingers, finger spreading means carried by said frame and engageable by said fingers after a predetermined lowering movement of said fingers under the action of said driving tool, means carried by said tool for lifting said fingers on the upward movement of the tool, and another finger spreading means carried by said frame and engageable by said fingers on the upward movement of the latter to permit insertion of a fastener between said fingers.

8. In a fastener driving machine, a frame, a rod slidably mounted in said frame, a spring bearing against said rod to support the same, spring fingers carried by said rod, a driving tool for a fastener slidably supported by said frame to move towards and away from said fingers, a supporting abutment movable with said tool for lifting said fingers on the upward movement of said tool, a pointed spreading member carried by said frame and engageable by parts of said fingers on the upward movement thereof, the tension of said parts against said pointed member being greater than the tension of said supporting spring, whereby said parts slip off said pointed member when said abutment is withdrawn from said fingers.

9. In a fastener driving machine, a frame, a rod slidably mounted in said frame, a spring bearing against said rod to support the same, spring fingers carried by said rod, a driving tool for a fastener slidably supported by said frame to move towards and away from said fingers, a supporting abutment movable with said tool for lifting said fingers on the upward movement of said tool, a pointed spreading member carried by said frame and engageable by parts of said fingers on the upward movement thereof, the tension of said parts against said pointed member being greater than the tension of said supporting spring, whereby said parts slip off said pointed member when said abutment is withdrawn from said fingers, and another finger spreading means carried by said frame and engageable by said parts after a predetermined lowering movement of said fingers.

10. In a fastener driving machine, a frame, a pair of spring fingers slidably supported by said frame and adapted to hold a fastener and move therewith, a driving tool for a fastener slidably supported by said frame to move towards and away from said fingers, and finger spreading means carried by said frame and engageable by said fingers after a predetermined lowering movement of said fingers under the action of said driving tool, said spreading means being adjustable lengthwise of said tool.

11. In a fastener driving machine, a frame, a pair of spring fingers slidably supported by said frame and adapted to hold a fastener and move therewith, a driving tool for a fastener slidably supported by said frame to move towards and away from said fingers, finger spreading means carried by said frame and engageable by said fingers after a predetermined lowering movement of said fingers under the action of said driving tool, means carried by said tool for lifting said fingers on the upward movement of the tool, and another finger spreading means carried by said frame and engageable by said fingers on the upward movement of the latter to permit insertion of a fastener between said fingers, both of said finger spreading means being adjustable lengthwise of said tool.

12. In a fastener driving machine, an upper spindle section, means for rotating the same, a lower spindle section having a rotary and sliding mounting on said upper section and suspended therefrom to descend therewith, said sections having each a horizontally disposed surface adapted for mutual engagement whereby said suspension is effected, means for rapidly venting the space formed between said surfaces on relative sliding thereof, cooperating clutch elements carried respectively by said sections, and means for lowering and raising said upper section and effecting engagement and disengagement of said clutch elements.

13. In a fastener driving machine, an upper spindle section, means for rotating the same, a lower spindle section having a rotary and sliding mounting on said upper section and suspended therefrom to descend therewith, said sections having each a horizontally disposed surface adapted for mutual engagement whereby said suspension is effected, a vent extending from one of said surfaces to the atmosphere for rapidly venting the space formed between said surfaces on relative sliding thereof, cooperating clutch elements carried respectively by said sections, and means for lowering and raising said upper section and effecting engagement and disengagement of said clutch elements.

In testimony whereof I affix my signature.

FRANK H. DELLAREE.